United States Patent Office 2,743,778
Patented May 1, 1956

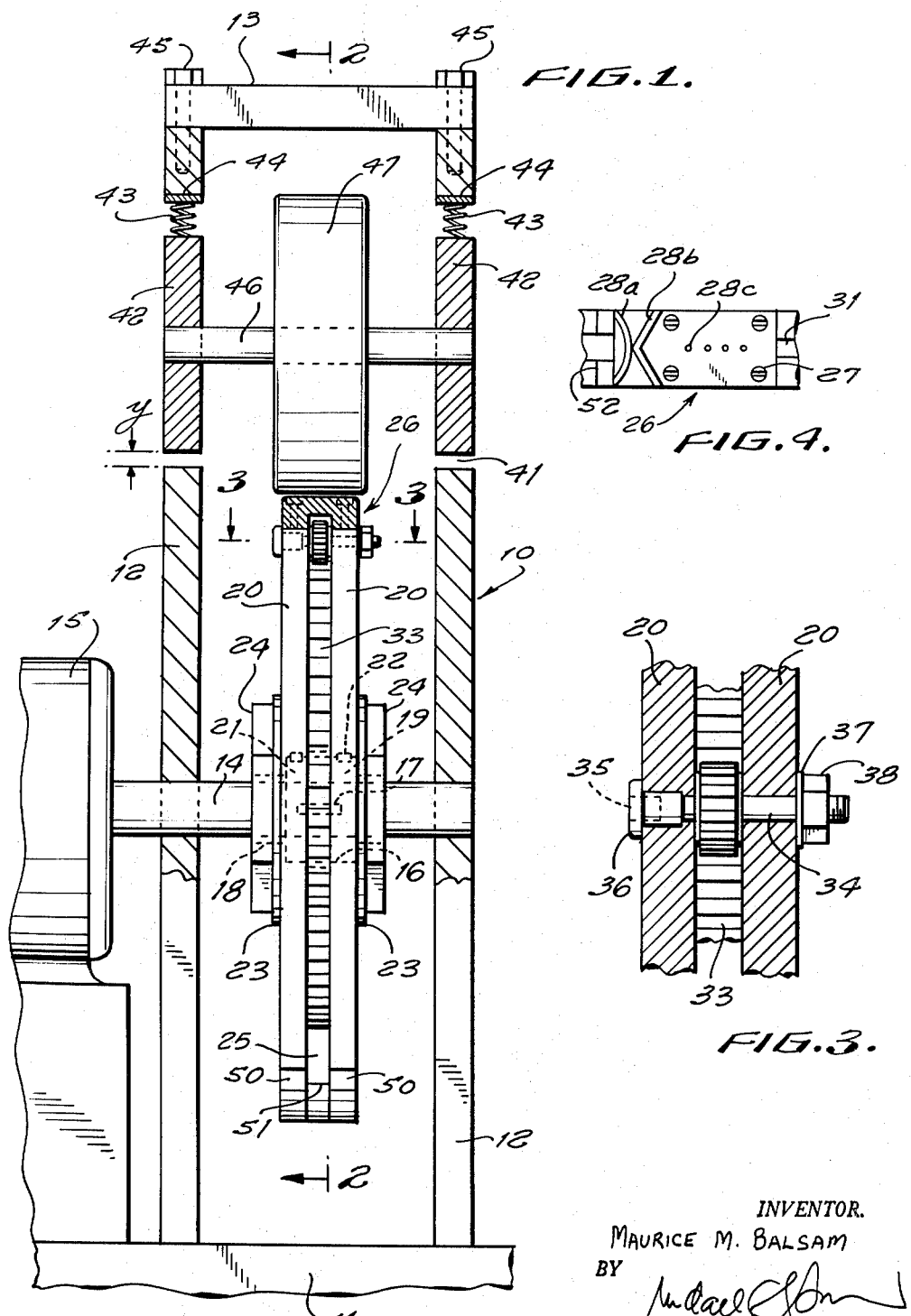

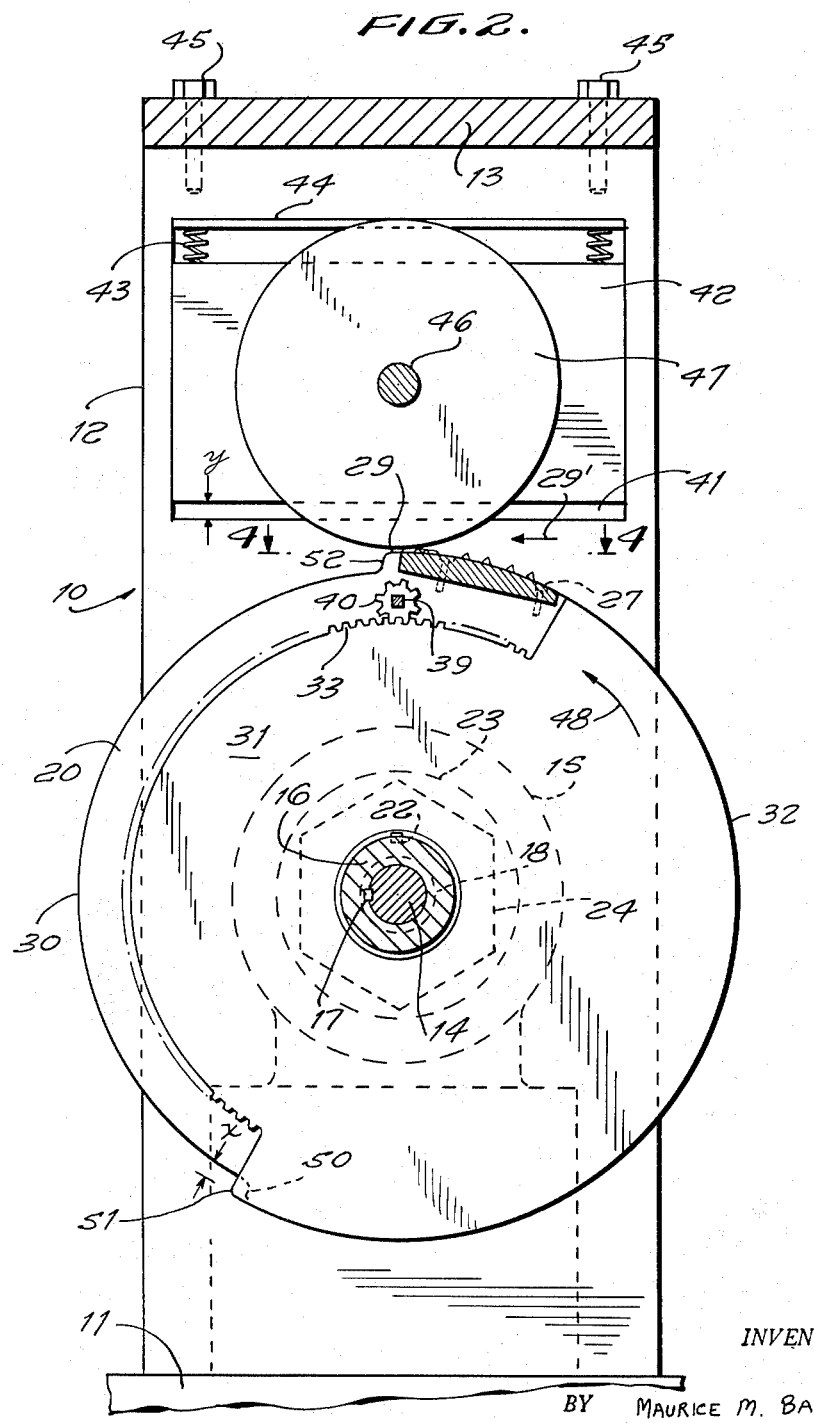

2,743,778

ADJUSTABLE BAND CUTTING APPARATUS

Maurice M. Balsam, New York, N. Y.

Application November 12, 1952, Serial No. 320,043

4 Claims. (Cl. 164—201)

The present invention relates to an adjustable band cutting apparatus.

More particularly, the present invention relates to an apparatus of the type disclosed in U. S. Patent No. 2,439,280 for continuously cutting bands of predetermined lengths from an elongated strip of material.

One of the objects of the present invention is to provide a very simple apparatus for continuously cutting bands from an elongated strip.

A further object of the present invention is to provide a band cutting apparatus of the above type with a very simple means for adjusting the lengths of the bands which are continuously cut from an elongated strip.

Yet another object of the present invention is to provide a band cutting apparatus of the above type which includes a minimum number of rollers and which has the means for adjusting the lengths of the cut bands incorporated in one of the rollers.

With the above objects in view, the present invention mainly consists of an apparatus for continuously cutting bands of predetermined adjustable lengths from a continuous strip, this apparatus including a support, a first roller means mounted on the support for turning movement about a first axis, a second roller means mounted on the support for turning movement about a second axis parallel to the said first axis, this second roller means having a first arcuate peripheral portion located at a greater radial distance from the second turning axis than a second peripheral portion extending between the ends of the first peripheral portion of the second roller means. A cutting means is fixedly mounted on one of the roller means at the periphery thereof, and an adjusting means is connected to the second roller means for adjusting the length of the first peripheral portion thereof. Finally, a turning means is operatively connected to the said second roller means for turning the same about the second axis.

The novel features which are considered as characteristic for the invention are set in particular in the appended claims. The invention itself, however, both as to its construction and its method of operation, together with additional objects and advantages thereof, will be best understood from the following description of specific embodiments when read in connection with the accompanying drawings, in which:

Fig. 1 is an end, elevational view, partly in section, of one possible apparatus constructed in accordance with the present invention;

Fig. 2 is a fragmentary, sectional veiw taken along line 2—2 of Fig. 1 in the direction of the arrows;

Fig. 3 is a fragmentary, sectional view taken along line 3—3 of Fig. 2 in the direction of the arrows; and Fig. 4 is a fragmentary plan view taken along line 4—4 of Fig. 2 in the direction of the arrows.

Referring now to the drawings, there is shown in Fig. 1 a support 10 which includes a base plate 11 from which a pair of side plates 12 extend upwardly, these side plates 12 being parallel to each other and fixed to the base plate 11. The side plates 12 are connected at their top ends by a plate 13 extending across the same and being fixed thereto by screws 45.

A shaft 14 extends through openings in the side plates 12 and is turnably supported thereon, this shaft 14 being fixedly connected to a motor 15 carried by an extension of base plate 11 so that the shaft is rotated by the motor 15 when the latter operates. The motor 15 is connected in any suitable way to a source of current.

A sleeve 16 is keyed, by a key 17, to the shaft 14 for rotation therewith, this sleeve 16 having opposite threaded end portions 18 of a smaller diameter than a central portion 19 of the sleeve 16. A pair of discs 20, having central apertures provided with countersunk portions 21, are mounted on the sleeve 16 and are keyed thereto by keys 22, respectively, so that these discs 20 are turnable as a unit with the sleeve 16 and shaft 14. A pair of washers 23 and nuts 24 are mounted at the outer sides of discs 20, as illustrated, with the nuts 24 threadedly engaging the threaded ends 18 of sleeve 16, respectively, to rigidly clamp the discs 20 to the sleeve, these discs 20 being limited in their movement toward each other by the engagement between the countersunk portions 21 of the discs 20 and the enlarged central part 19 of sleeve 16.

There is thus provided between the discs 20 a space 25. A cutting means 26 bridges this space 25 and is fixed to peripheral portions of the discs 20 by any suitable means, such as the countersunk screw members 27. The outer surface of the cutting means 26 is arcuate and carries the cutting members 28a, 28b, and 28c (Fig. 4) for cutting bands of the type disclosed, for example, in U. S. Patent No. 2,439,280, mentioned above.

It will be seen from the drawings that each disc 20 is provided with a first, circular, arcuate, peripheral portion 29 located at a greater radial distance from the central turning axis of shaft 14 than a second, peripheral, portion 30 of each disc 20 which extends between the ends of the peripheral portion 29. The peripheral portions 29 and 30 of the discs 20 are located opposite and in alignment with each other, and the cutting means 26 is connected to the discs 20 at their peripheral portions 29 and adjacent one end 52 of these peripheral portions 29.

A plate 31 is turnably mounted, for free turning movement, on a sleeve 16 in the space 25 between discs 20, this plate 31 having its sides in sliding engagement with the discs 20, respectively. The plate 31 has a circular, arcuate peripheral portion 32 located at the same radial distance from the central turning axis of shaft 14 as the peripheral portions 29 of discs 20, and this plate 31 has a second, toothed peripheral portion 33 located from the turning axis of shaft 14 by a smaller radial distance than the peripheral portion 32.

A bolt 34 extends through bores in the discs 20 (Fig. 3) and is turnably mounted on these discs, the bolt 34 having a non-cylindrical socket 35 formed in the head 36 thereof to reecive a wrench for manually turning the bolt 34. The latter is fixed to the discs 20 by the washer 37 and nut 38, and upon loosening of the latter the bolt 34 may be turned. This bolt 34 is provided between the discs 20 with a portion 39 of square cross section (Fig. 2), and a pinion 40 having a square central aperture is mounted on portion 39 of bolt 34 in the space 25 and in mesh with the toothed peripheral portion of plate 31, so that upon turning movement of pinion 39 the plate 31 will be turned to have its angular relation with discs 20 adjusted.

It is apparent from Fig. 2 that the peripheral portions 29 of discs 20 extend through somewhat more than 180°, while the peripheral portion 32 of plate 31 extends through about 180°. Thus, upon loosening of nut 38 and turning of bolt 34, the pinion 40 may be rotated to turn plate 31 in a clockwise direction, as viewed in Fig. 2, so as to locate peripheral portion 32 by a predetermined distance beyond the end 50 of peripheral portions 29 opposite end 52 where the cutting means 26 is located. In this way, the peripheral portion 32 of plate 31 provides a continuation of peripheral portions 29 of discs 20 to adjust the lengths of the bands cut from a continuous strip, as will be fully described below.

Each of the side plates 12 of support 10 is provided with a vertical slot 41, and these vertical slots are located opposite each other (Fig. 1). In these vertical slots a pair of blocks 42 are respectively slidably mounted for vertical movement, these blocks 42 being limited to vertical sliding movement in the slots 41 by any suitable guide means (not shown). A pair of springs 43 respectively engage the blocks 42 on the top sides thereof to urge the same downwardly, and plates 44 are slidably mounted in slots 41 and respectively engage the springs 43, these plates being vertically movable by means of any suitable adjusting structure (not shown), so that the force of springs 43 may be adjusted. The blocks 42 turnably support a shaft 46 for turning movement about an axis parallel to the axis of shaft 14, and a pressure roller 47 is keyed to the shaft 46 for rotation therewith, this pressure roller 47 being urged toward the discs 20 by the springs 43 and being rotated by contact with the peripheral portions 29 and 32 of discs 20 and plate 31, respectively.

The above described apparatus operates as follows:

A long strip of material from which the bands are to be cut is placed on any suitable support (not shown) from which the strip may conveniently be drawn. One end of this strip is placed, at the start of the operation, between the roller 47 and the discs 20. Then the motor 15 is started to rotate the discs 20 and plate 31 in the direction of arrows 48 (Fig. 2) so as to draw the strip in the direction of arrow 29'. The cutter member 28a cooperates with roller 47 to cut off an end of the strip, and at the same time the cutter member 28b will press the next part of the strip against the roller 47 and cut the same to a point. The cutter members 28c will form openings in the next portion of the strip and the continued rotation of discs 20 will cause the peripheral portions 29 thereof to cooperate with roller 47 to move the strip between the discs 20 and roller 47. At the end 50 of peripheral portions 29, the peripheral portion 32 of plate 31 will cooperate with roller 47 to continue the movement of the strip between the roller 47 and the peripheral portion 32, until the end 51 of peripheral portion 32 moves a slight distance beyond the lowermost point of roller 47.

At this time the springs 43 will move the pressure roller 47 downwardly because the pressure roller 47 becomes located opposite the peripheral portion 30 of the discs 20, and this peripheral portion 30 is located at a smaller radial distance from the turning axis of shaft 14 than the peripheral portions 29 and 32 of the discs 20 and plate 31, respectively. The difference $x$ between the radial distance of peripheral portions 29 and 32, of discs 20 and plate 31, respectively, and the radial distance of peripheral portion 30 of discs 20 (Fig. 2) is greater than the distance $y$ between the bottom of slots 41 and the lowermost part of blocks 42 when the pressure roller 47 is located opposite the peripheral portions 29 and 32 of discs 20 and plate 31, respectively. Therefore, when the point 51 of peripheral portion 32 of plate 31 moves beyond the lowermost part of perssure roller 47 in the direction of arrow 48, the springs 43 will move the pressure roller 47 downwardly, but the bottom of slots 41 will engage the blocks 42 before the pressure roller 47 can contact the peripheral portions 30 of discs 20, because the distance $x$ is greater than the distance $y$, and therefore the pressure roller 47 is always maintained in spaced relation to the peripheral portions 30 of discs 20.

As a result of this construction, the turning of discs 20 and plate 31 in the direction of arrow 48 only moves the strip to be cut in the direction of arrow 29 until point 51 of peripheral portion 32 of plate 31 moves slightly beyond the lowermost point of roller 47. After this point in the operation, the discs 20 and plate 31 simply rotate while the strip remains stationary beneath the roller 47, the peripheral portions 30 simply slipping along the strip and being unable to press the same against pressure roller 40 because the distance $x$ is appreciably greater than the distance $y$, this difference between the distances $x$ and $y$ being greater than the thickness of the strip being cut into bands. This strip therefore remains stationary beneath the roller 47 until the ends 52 of peripheral portions 29 of discs 20 again approach the lowermost part of the roller 47 which causes the latter to be raised against the action of springs 43 so that the strip being cut is again pressed against the roller 47 and moves in the direction of arrow 49. Shortly after the movement of the strip is again started, the cutting member 28a severs a length of the strip to produce a band of predetermined length, and simultaneously the cutting member 28b produces a point on the end of the next part of the strip and presses the same against roller 47 to cause the strip to be continuously moved until the point 51 of peripheral portion 32 of plate 31 again moves beyond the lowermost point of roller 47. The above operations are repeated over and over so as to continually produce bands of predetermined length from a continuous strip.

It is believed to be evident that the angular adjustment of plate 31 with respect to discs 20, produced by the turning of pinion 40, as described above, will cause the peripheral portion 32 of plate 31 to extend beyond the end 50 of peripheral portions 29 of discs 20 by a predetermined distance which will control the length of the bands which are continuously cut from the strip. One of the discs 20 may be provided with graduations, having any suitable indicia such as the length of the bands cut from the strip, and therefore the angular position of plate 31 with respect to discs 20 may conveniently be adjusted to produce a desired length of band.

The above-described apparatus may be used to cut any strips into bands of predetermined lengths, and cutting members 28a and 28b may have any desired shape while members 28c may be omitted if openings are not desired.

It will be understood that each of the elements described above, or two or more together, may also find a useful application in othes types of band cutting apparatus differing from the types described above.

While the invention has been illustrated and described as embodied in adjustable and continuous band cutting apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Roller apparatus for use with a device for cutting bands of predetermined, adjustable lengths from a continuous strip, said roller apparatus comprising, in combination, a hollow sleeve having a central axis; a pair of discs each having a central axis coincident with said sleeve axis and each being fixed to said sleeve, said discs being spaced from each other and each having a first arcuate peripheral portion located at a greater radial distance from said sleeve axis than a second peripheral portion extending between the ends of said first peripheral portion, and said first and second peripheral portions of said discs being located opposite and in alignment with each other; a plate located between said discs and being turnably mounted on said sleeve for movement about said axis thereof, said plate having a first arcuate peripheral portion located at the same radial distance from said sleeve axis as said first peripheral portions of said discs, and said plate having a second, toothed, arcuate peripheral portion located at a smaller radial distance from said sleeve axis than said first peripheral portion of said plate; a pinion turnably mounted on one of said discs and being located between said discs and in mesh with said toothed peripheral portion of said plate; manual turning means operatively connected to said pinion for turning the same to locate said first peripheral portion of said plate in overlapping relation with and at a predetermined distance beyond one end of said first peripheral portion of said discs; and cutting means bridging the distance between said discs and being fixed to said first peripheral portions of the latter adjacent an end opposite said one end thereof.

2. Apparatus for continuously cutting bands of predetermined adjustable lengths from an elongated strip, comprising, in combination, a hollow sleeve having a central axis; a pair of discs each having a central axis coincident with said sleeve axis and each being fixed to said sleeve, said discs being spaced from each other and each having a first arcuate peripheral portion located at a greater radial distance from said sleeve axis than a second peripheral portion extending between the ends of said first peripheral portion, and said first and second peripheral portions of said discs being located opposite and in alignment with each other; a plate located between said discs and being turnably mounted on said sleeve for movement about said axis thereof, said plate having a first arcuate peripheral portion located at the same radial distance from said sleeve axis as said first peripheral portions of said discs, and said plate having a second, toothed, arcuate peripheral portion located at a smaller radial distance from said sleeve axis than said first peripheral portion of said plate; a pinion turnably mounted on one of said discs and being located between said discs and in mesh with said toothed peripheral portion of said plate; manual turning means operatively connected to said pinion for turning the same to locate said first peripheral portion of said plate in overlapping relation with and at a predetermined distance beyond one end of said first peripheral portion of said discs; cutting means bridging the distance between said discs and being fixed to said first peripheral portions of the latter adjacent an end opposite said one end thereof; a shaft passing through said sleeve along said central axis thereof and being fixed to said sleeve; support means turnably supporting said shaft for turning movement about said sleeve axis; a pressure roller turnably mounted on said support means next to said discs for rotation about an axis parallel to said sleeve axis, said pressure roller having its periphery facing said peripheral portions of said discs; drive means connected to said shaft for rotating the same and said discs and plate therewith; and limiting means associated with said pressure roller for limiting the movement thereof toward said central axis of said discs to a distance which is less than the difference between the radial distances of said first and second peripheral portions of said discs from said central axis thereof.

3. Apparatus for continuously cutting bands of predetermined adjustable lengths from an elongated strip, comprising, in combination, a hollow sleeve having a central axis; a pair of discs each having a central axis coincident with said sleeve axis and each being fixed to said sleeve, said discs being spaced from each other and each having a first arcuate peripheral portion located at a greater radial distance from said sleeve axis than a second peripheral portion extending between the ends of said first peripheral portion, and said first and second peripheral portions of said discs being located opposite and in alignment with each other; a plate located between said discs and being turnably mounted on said sleeve for movement about said axis thereof, said plate having a first arcuate peripheral portion located at the same radial distance from said sleeve axis as said first peripheral portions of said discs, and said plate having a second, toothed, arcuate peripheral portion located at a smaller radial distance from said sleeve axis than said first peripheral portion of said plate; a pinion turnably mounted on one of said discs and being located between said discs and in mesh with said toothed peripheral portion of said plate; manual turning means operatively connected to said pinion for turning the same to locate said first peripheral portion of said plate in overlapping relation with and at a predetermined distance beyond one end of said first peripheral portion of said discs; cutting means bridging the distance between said discs and being fixed to said first peripheral portions of the latter adjacent an end opposite said one end thereof; a shaft passing through said sleeve along said central axis thereof and being fixed to said sleeve; support means turnably supporting said shaft for turning movement about said sleeve axis; a pressure roller turnably mounted on said support means next to said discs for rotation about an axis parallel to said sleeve axis, said pressure roller having its periphery facing said peripheral portions of said discs; drive means connected to said shaft for rotating the same and said discs and plate therewith; resilient means operatively connected to said pressure roller for urging the same toward said discs; and limiting means associated with said resilient means for limiting the movement of said pressure roller under the action of said resilient means to a distance which is less than the difference between the radial distances of said first and second peripheral portions of said discs from said central axis thereof.

4. Apparatus for continuously cutting bands of predetermined adjustable lengths from an elongated strip, comprising, in combination, a hollow sleeve having a central axis; a pair of discs each having a central axis coincident with said sleeve axis and each being fixed to said sleeve, said discs being spaced from each other and each having a first arcuate peripheral portion located at a greater radial distance from said sleeve axis than a second peripheral portion extending between the ends of said first peripheral portion, and said first and second peripheral portions of said discs being located opposite and in alignment with each other; a plate located between said discs and being turnably mounted on said sleeve for movement about said axis thereof, said plate having a first arcuate peripheral portion located at the same radial distance from said sleeve axis as said first peripheral portions of said discs, and said plate having a second, toothed, arcuate peripheral portion located at a smaller radial distance from said sleeve axis than said first peripheral portion of said plate; a pinion turnably mounted on one of said discs and being located between said discs and in mesh with said toothed peripheral portion of said plate; manual turning means operatively connected to said pinion for turning the same to locate said first peripheral portion of said plate in overlapping relation with and at a predetermined distance beyond one end of said first peripheral portion of said discs; cutting means bridging the distance between said discs and being fixed to said first peripheral portions of the latter adjacent an end opposite said one end thereof; a shaft passing through said sleeve along said central axis thereof and being fixed to said sleeve; support means turnably supporting said shaft for turning movement about said sleeve axis; a pressure roller turnably mounted on said support means next to said discs for rotation about an axis parallel to said sleeve axis, said pressure roller having its periphery facing said peripheral portions of said discs; drive means connected to said shaft for rotating the same and said discs and plate therewith; resilient means operatively connected to said pressure roller for urging the same toward said discs; and limiting means associated with said resilient means for limiting the movement of said pressure roller under the action of said resilient means to a distance which is less than the difference between the radial distances of said first and second peripheral portions of said discs from said central axis thereof.

References Cited in the file of this patent

UNITED STATES PATENTS

| | | |
|---|---|---|
| 284,860 | Jones | Sept. 11, 1883 |
| 1,754,057 | Sherman | Apr. 8, 1930 |
| 1,879,465 | Phinney | Sept. 27, 1932 |
| 2,140,065 | Waechter | Dec. 13, 1938 |
| 2,316,054 | Davis | Apr. 6, 1943 |
| 2,439,280 | Balsam | Apr. 6, 1948 |

FOREIGN PATENTS

| | | |
|---|---|---|
| 278,129 | Germany | Sept. 21, 1914 |
| 650,464 | Germany | Sept. 23, 1937 |